United States Patent
Venanzi et al.

(10) Patent No.: US 12,197,421 B2
(45) Date of Patent: Jan. 14, 2025

(54) CROSS-PROVIDER TOPIC CONFLATION

(71) Applicant: Microsoft Technology Licensing, LLC, Redmond, WA (US)

(72) Inventors: Matteo Venanzi, London (GB); John M. Winn, Cambridge (GB); Ivan Korostelev, London (GB); Elena Pochernina, London (GB); Samuel Webster, Cambridge (GB); Pavel Myshkov, London (GB); Yordan Zaykov, Cambridge (GB); Dmitriy Meyerzon, Bellevue, WA (US); Vladimir V. Gvozdev, Sammamish, WA (US); Nikita Voronkov, Bothell, WA (US); Alexander A. Spengler, Cambridge (GB)

(73) Assignee: Microsoft Technology Licensing, LLC, Redmond, WA (US)

(*) Notice: Subject to any disclaimer, the term of this patent is extended or adjusted under 35 U.S.C. 154(b) by 343 days.

(21) Appl. No.: 17/241,217

(22) Filed: Apr. 27, 2021

(65) Prior Publication Data
US 2022/0342871 A1 Oct. 27, 2022

(51) Int. Cl.
*G06F 16/23* (2019.01)
*G06F 7/14* (2006.01)
(Continued)

(52) U.S. Cl.
CPC ............ *G06F 16/2379* (2019.01); *G06F 7/14* (2013.01); *G06F 16/285* (2019.01); *G06F 16/35* (2019.01); *G06N 20/00* (2019.01)

(58) Field of Classification Search
CPC ..... G06F 16/2379; G06F 16/285; G06F 16/35
See application file for complete search history.

(56) References Cited

U.S. PATENT DOCUMENTS 9,672,555 B1* 6/2017 Dillard .................... G06F 16/35
2010/0082594 A1* 4/2010 Bhat ..................... G06F 16/951
707/E17.014

(Continued)

OTHER PUBLICATIONS

Turan et al., "Automatize Document Topic and Subtopic Detection with Support of a Corpus," Procedia-Social and Behavioral Sciences 177 (2015): 169-177. (Year: 2015).*

(Continued)

*Primary Examiner* — Jay A Morrison
(74) *Attorney, Agent, or Firm* — Shook, Hardy & Bacon L.L.P.

(57) ABSTRACT

Examples of the present disclosure describe systems and methods for cross-provider topic conflation. In aspects, a request relating to one or more topics may be received by a content surfacing platform. One or more data sources of multiple content providers may be searched for documents relating to the topic(s). Document content (e.g., document metadata and sentences, phrases, and other word content within the document) relating to the topic(s) may be extracted from the documents of the various content providers. The document content may be classified and/or separated into subparts. The subparts may be clustered and/or conflated by topic, thereby removing duplicated data while preserving the unique information in each subpart. The conflated topics may be stored in a single knowledge base, such as an enterprise knowledge graph, and/or presented in response to the request.

20 Claims, 8 Drawing Sheets

(51) Int. Cl.
   *G06F 16/28* (2019.01)
   *G06F 16/35* (2019.01)
   *G06N 20/00* (2019.01)

(56) References Cited

U.S. PATENT DOCUMENTS

| | | |
|---|---|---|
| 2017/0300823 A1* | 10/2017 | Bostick .................. H04L 67/306 |
| 2018/0218075 A1 | 8/2018 | James et al. |
| 2019/0354544 A1 | 11/2019 | Hertz et al. |
| 2021/0110278 A1 | 4/2021 | Meyerzon et al. |
| 2022/0129471 A1* | 4/2022 | Zellner ............. G06F 16/24578 |

OTHER PUBLICATIONS

"International Search Report and Written Opinion Issued in PCT Application No. PCT/US22/023216", Mailed Date: Aug. 2, 2022, 12 Pages.

Communication pursuant to Article 94(3) EPC Received for European Application No. 22719124.4, mailed on Oct. 11, 2024, 07 pages.

* cited by examiner

CROSS-PROVIDER TOPIC CONFLATION

BACKGROUND

A knowledge graph is a knowledge base that implements a graph-structured data model to store interlinked entities or topics and the relationships between those entities/topics. The construction of a knowledge graph involves mining entities/topics from various data sources and/or content providers. In many cases, the various data sources and/or content providers may provide duplicative and/or conflicting data (e.g., descriptions, definitions, properties) for a particular entity/topic. As a result, the resulting knowledge graph may comprise duplicate, conflicting, or erroneous data for the particular entity/topic. When such data is surfaced to a user, the user may be confused or misled about the particular entity/topic.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for cross-provider topic conflation. In aspects, a request relating to one or more topics may be received by a content surfacing platform. One or more data sources of multiple content providers may be searched for documents relating to the topic(s). Document content (e.g., document metadata and sentences, phrases, and other word content within the document) relating to the topic(s) may be extracted from the documents of the various content providers. The document content may be classified and/or separated into subparts. The subparts may be clustered and/or conflated by topic, thereby removing duplicated data while preserving the unique information in each subpart. The conflated topics may be stored in a single knowledge base, such as an enterprise knowledge graph, and/or presented in response to the request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
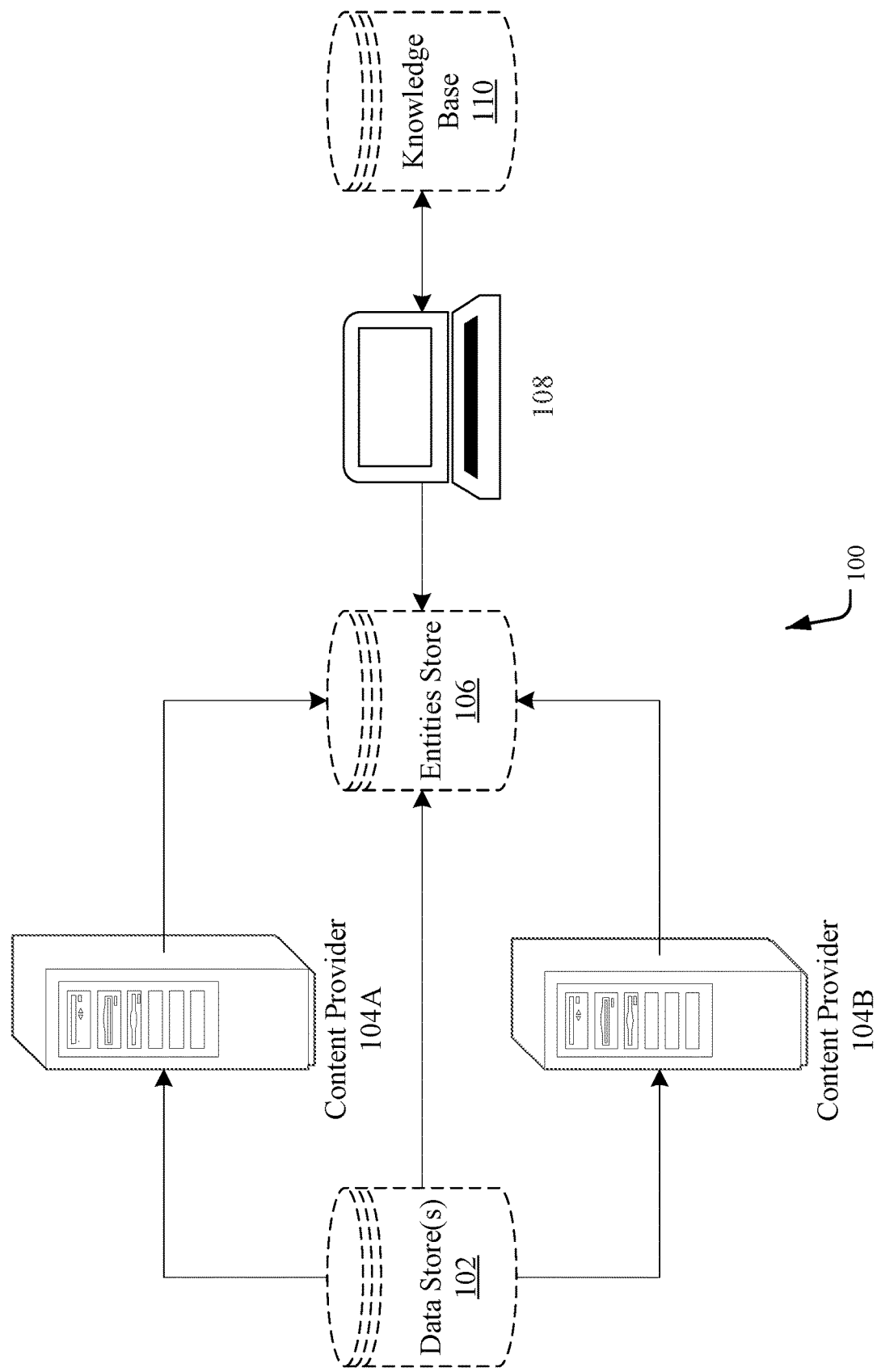
FIG. 1 illustrates an overview of an example system for cross-provider topic conflation.

A knowledge graph is a powerful tool that interlinks entities or topics by relationships that describe a domain, such as an organization, a realm of software engineering, a project, or a subject area. Knowledge graphs are often implemented by an organization (and other groups and/or individuals) to provide a unified view of the organization's data, content, and other knowledge assets. For example, an organization may implement an enterprise knowledge graph that enables semantic searching of the organization's documents. The enterprise knowledge graph may enable logical inference for retrieving explicit and implicit knowledge relating to the documents and the entities or topics associated with the documents.

To construct knowledge graphs, content providers mine topics of documents and informational content from various data sources. In many cases, multiple content providers may mine topics from one or more of the same data sources, or from different data sources comprising documents and informational content on the same (or substantially similar) topics. In such cases, the data mined for the topics may vary for each content provider due to the different mining processes used by content providers. For example, the content providers may use different machine learning technologies (e.g., deep learning, graphical models, decision trees) to perform the mining. Due to the variance between the data sets of content providers, one or more of the content providers may provide data that is erroneous, misleading, or in conflict with the data of other content providers. This scenario is particularly troublesome for organizations that solicit data from multiple content providers. For example, in response to a user search query for a particular topic, such as "VSM," a search service of an organization may collect and present data from two separate content providers. The first content provider may provide result data for "Virtual Secure Mode" and the second content provider may provide result data for "Value Stream Map." The result set for "VSM" may conflate result data for "Virtual Secure Mode" with result data for "Value Stream Map." The conflated result data may be used to generate or update a knowledge graph for the organization. Consequently, the user may be misinformed and/or confused by the over-conflated result data in the knowledge graph.

To address such challenges with collecting and presenting data from separate content providers, the present disclosure describes systems and methods for cross-provider topic conflation. A topic, as used here, may refer to a project, a product, a company, an organization, a policy, a tool, or any other subject. In aspects, an enterprise (e.g., organization, business, group, individual) may implement a content surfacing platform for searching for and surfacing data, content, and other knowledge assets of (or of interest to) the enterprise. A data request relating to one or more topics may be received by the content surfacing platform. For example, a user associated with enterprise may provide a search query for a particular topic. In response to the data request, the content surfacing platform may search two or more content providers for documents and other content relating to the topic. A set of documents comprising or relating to the topic may be collected from each content provider. The set of documents may comprise documents that are internal to the content surfacing platform ("internal documents") and documents that are external to the content surfacing platform ("external documents"). Document entities (e.g., document metadata and sentences, phrases, and other word content within the document) relating to the topic may be extracted from the documents.

The extracted document entities may be separated into entity subparts. The entity subparts may represent properties of the extracted document entities and may vary between internal documents and external documents. For example, the document entities for internal documents may comprise properties that are implemented by or compatible with by the content surfacing platform, such as site ID, entity ID, author ID, etc. In contrast, the document entities for external documents may comprise properties that are not implemented by or compatible with the content surfacing platform, such as a webpage uniform resource locator (URL), a webpage link URL, or a document identifier for a system external to the content surfacing platform. For this reason, the separation process for internal documents may differ from the separation process for external documents.

For example, while separating the document entities into entity subparts, an indicator of the source document from which the corresponding document entity was extracted may be added to the entity subpart. The indicator may also specify that content provider that collected the source document. For internal documents, the indicator may correspond to, for example, a site ID of the content surfacing platform. For external documents, the indicator may correspond to, for example, a webpage URL. Accordingly, content in the document entities for external documents may be assigned to generic properties or to properties implemented by the system. For example, the URL for an external document may be assigned to a source ID property, which may indicate to the content surfacing platform that the URL is the source of the external document. Alternatively, the uniform resource locator (URL) for the external document may be assigned to a site ID property of the content surfacing platform.

Each of the entity subparts may be clustered under a respective topic based on the content of the content of the subpart and/or the indicator of the source document from which the corresponding document entity was extracted. Each unique entity subpart in a cluster may then be merged to that respective topic; thereby conflating the entity subparts from multiple content providers under the topic. Such conflation prevents erroneous or misleading data from being merged to a topic, prevents data duplication, and preserves the unique information in each subpart. Due to the indicator of the source document, the conflation also enables the content contributions of content providers to be selectively and dynamically enabled or disabled. In aspects, the conflated topics may be stored in a single enterprise knowledge base for the enterprise and/or presented in response to the data request.

Accordingly, the present disclosure provides a plurality of technical benefits including but not limited to: improving the accuracy and relevance of data provided to an enterprise; disassociating incorrectly conflated entities in content provider data; preventing data duplication of identical and similar data entities, providing a single knowledge graph comprising data conflated from multiple content providers; enabling the selective addition or removal of content from documents, websites, and/or particular content providers; providing a consistent topic conflation process for internal enterprise documents and external documents (e.g., documents not owned or restricted to use by a particular enterprise); reducing the processing speed and computational requirements associated with multi-content provider data retrieval (e.g., a single internal data source may be used instead of multiple internal and/or external data sources); reducing the data storage requirements for an knowledge graph (e.g., topic conflation may reduce the number of entities associated with and stored for a topic); and preserving the content and source identification of each content provider during the conflation process, among other examples.

FIG. 1 illustrates an overview of an example system for cross-provider topic conflation. Example system 100 as presented is a combination of interdependent components that interact to form an integrated whole. Components of system 100 may be hardware components or software components (e.g., applications, application programming interfaces (APIs), modules, virtual machines, or runtime libraries) implemented on and/or executed by hardware components of system 100. In one example, system 100 may provide an operating environment for software components to execute and utilize resources or facilities of system 100. An example of one or more processing devices comprising such an operating environment is depicted in FIGS. 4-7. In another example, the components of systems disclosed herein may be distributed across multiple devices. For instance, input may be entered on a user device or client device and information may be processed on or accessed from other devices in a network, such as one or more remote cloud device or web server devices.

In FIG. 1, system 100 comprises data store(s) 102, content providers 104A and 104B (collectively "content provider(s) 104"), entities store 106, computing device 108, and knowledge base 110. One of skill in the art will appreciate that the scale of systems such as system 100 may vary and may include additional or fewer components than those described in FIG. 1. As one example, system 100 may comprise additional content provider(s) 104 and/or entities store 106. As another example, the content of data store(s) 102, entities store 106, and/or knowledge base 110 may be integrated into computing device 108.

Data store(s) 102 may be configured to store documents, files, and others type of content (collectively referred to as "documents") relating to, among other things, an enterprise (or multiple enterprises). The documents may relate to knowledge assets associated with the enterprise(s). A knowledge asset, as used herein, may refer to accumulated intellectual resources, such as information, insights, cognitive and technical skills, capabilities, etc. Some of the documents stored by data store(s) 102 may be created and/or owned by the enterprise(s) ("internal documents"). Access to the internal documents may be restricted to a set of authorized members or associated with the enterprise. Other documents stored by data store(s) 102 may not be created and/or owned by the enterprise(s) ("external documents"). Access to the external documents may not be restricted. For example, the external documents may be publicly available on the Internet.

In aspects, data store(s) 102 may be located in a cloud environment, a web environment, a client environment, or a combination thereof. For example, a first data store(s) 102 may be a graph database in a web-based collaborative platform, a second data store(s) 102 may be a search engine database cluster, and a third data store(s) 102 may be a file directory on a user device. Examples of data store(s) 102 include, but are not limited to, databases, file systems, file directories, flat files, and virtualized storage systems.

Content provider(s) 104 may be configured to provide content to one or more sources in response to receiving a data request. In some examples, the data request may be received via an interface, such as a graphical user interface (GUI), provided by (or associated with) content provider(s) 104. Such a data request may be provided in real-time by a user. In other examples, the data request may be received as part of an automated data retrieval process. For instance, the data request may be executed at predefined time intervals (e.g., hourly, daily, weekly). The data request may comprise one or more terms or indications of user intent. Based on the terms or indications of user intent, content provider(s) 104 may query one or more data stores, such as data store(s) 102, for relevant documents (e.g., documents comprising, or relating to, the terms or indications of user intent).

Upon identifying one or more documents, content provider(s) 104 may process the documents using one or more machine learning technologies (e.g., deep learning, graphical models, decision trees). The processing may include mining the documents for document entities, such as document metadata, topics, curated topic pages, acronyms, definitions, experts, authors/contributors, and other types of document information. Content provider(s) 104 may store the document entities in one or more locations. Examples of content provider(s) 104 include, but are not limited to, systems and devices that perform machine learning, information retrieval, data mining, natural language processing, and other types of artificial intelligence (AI)-based learning. Examples of such devices include server devices, cloud computing devices, and similar devices.

Entities store 106 may be configured to store the document entities of one or more documents. In examples, the document entities may be received from one or more data storage locations, such as data store(s) 102 and/or content provider(s) 104. Entities store 106 may provide one or more devices with access to document entities. For example, in response to the data request, entities store 106 may provide document entities associated with the data request to computing device 108. Examples of entities store 106 include, but are not limited to, the examples discussed with respect to data store(s) 102.

Computing device 108 may be configured to conflate document entities under one or more topics. For example, computing device 108 may enable a user to perform a text-based data request for one or more topics relating to an enterprise associated with the user. In response to the request, entities store 106 may provide document entities from multiple content providers to computing device 108. Computing device 108 may use one or more data separation mechanisms to separate the document entities into subparts. An indication of the source document from which a document entity was collected may be added to each subpart. The data separation mechanism(s) used may vary based on, for example, whether a document entity was extracted from an internal document or an external document. The data separation mechanism(s) may be stored locally on computing device 108 or accessed remotely from computing device 108.

Computing device 108 may use one or more data clustering mechanisms to cluster the subparts of the document entities under one or more topics. Computing device 108 may merge the clustered document entities to their respective topics using a linking algorithm. The conflated topics may be stored in one or more locations and/or provided in response to the data request. The data clustering mechanism(s) and/or the linking algorithm may be stored locally on computing device 108 or accessed remotely from computing device 108. In at least one example, two or more of the data separation mechanism(s), the data clustering mechanism(s) and/or the linking algorithm may be integrated into a single algorithm or model.

In aspects, computing device 108 may include sensors, applications, and/or services for receiving or collecting input. Example sensor include microphones, touch-based sensors, keyboards, pointing/selection tools, optical/magnetic scanners, accelerometers, magnetometers, gyroscopes, etc. The input may include, for example, voice input, touch input, text-based input, gesture input, video input, and/or image input. Examples of computing device 108 include, but are not limited to, personal computers (PCs), server devices, mobile devices (e.g., smartphones, tablets, laptops, personal digital assistants (PDAs)), wearable devices (e.g., smart watches, smart eyewear, fitness trackers, smart clothing, body-mounted devices, head-mounted displays), and gaming consoles or devices.

Knowledge base 110 may be configured to provide access to a corpus of data. In examples, computing device 108 may store conflated topics from multiple content providers in knowledge base 110. Knowledge base 110 may provide a conflated topic in response to a query for, or relating to, the topic. Examples of knowledge base 110 include, but are not limited to, knowledge graphs, graph databases, relational databases, semantic networks, and property graphs. For example, knowledge base 110 may represent a knowledge graph for an enterprise and the conflated topics may represent topics relevant to, or associated with, the enterprise.

Figure 2:
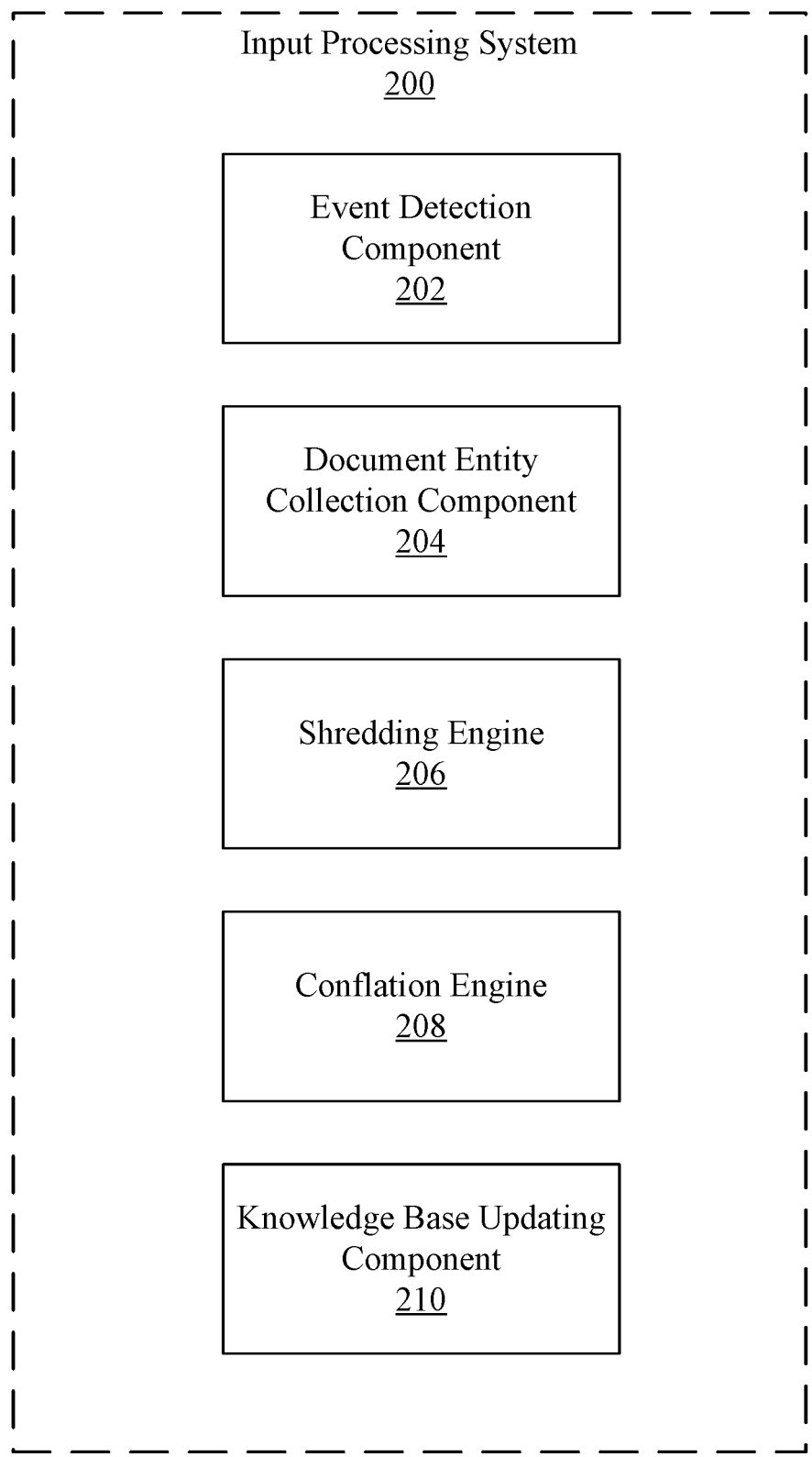
FIG. 2 illustrates an example input processing system for cross-provider topic conflation.

FIG. 2 illustrates an example input processing system for cross-provider topic conflation. In aspects, input processing system 200 may represent one or more computing devices having access to a content surfacing platform. The content surfacing platform may comprise or provide access to documents and content owned by an enterprise ("internal documents"). Access to the internal documents may be restricted to a set of authorized users, such as members of the enterprise or to users authorized by the enterprise to access the internal documents. The content surfacing platform may also comprise or provide access to documents and contents that are not owned by (or in the possession of) the enterprise ("external documents"). Access to the external documents may not be restricted, such that the external documents are generally accessible to all users. Input processing system 200 may have access to an enterprise knowledge graph that provides access to internal and/or external documents. The techniques implemented by input processing system 200 may comprise the techniques and data described in system 100 of FIG. 1. Although examples in FIG. 2 and subsequent figures will be discussed in the context of knowledge graphs (specifically, enterprise knowledge graphs), the examples are equally applicable to other technologies, such as graph databases and relational databases. In some examples, one or more components described in FIG. 2 (or the functionality thereof) may be distributed across multiple devices. In other examples, a single device may comprise the components described in FIG. 2.

In FIG. 2, input processing unit 200 comprises event detection component 202, document entity collection component 204, shredding engine 206, conflation engine 208, and knowledge base updating component 210. One of skill in the art will appreciate that the scale of input processing system 200 may vary and may include additional or fewer components than those described in FIG. 2. As one example, the functionality of shredding engine 206 and conflation engine 208 may be integrated into a single component. As another example, input processing unit 200 may additionally comprise one or more data stores that store documents, document entities, and/or one or more knowledge graphs.

Detection component 202 may be configured to detect one or more events. For example, detection component 202 may comprise or have access to an event listener. The event listener may monitor for the occurrence of an event, such as a data request for one or more topics, an update to one or more documents or data sources, an update to relationship information in a knowledge graph, an update to a content provider, etc. Upon detecting the occurrence of the event, detection component 202 may capture the event and/or process the event. Processing the event may include using parsing techniques to identify keywords, timestamps, or other information relating to the event. Detection component 202 may provide an indication of the event to one or more components of input processing unit 200. The indication may comprise at least the topic(s) indicated in the data request.

Document entity collection component 204 may be configured to collect document entities from one or more locations. For example, document entity collection component 204 may receive an indication of a detected event from detection component 202. In response to receiving the indication, document entity collection component 204 may query one or more data stores, such as entities store 106, for document entities (e.g., document metadata, topics, curated topic pages, acronyms, definitions, experts, authors/contributors) relevant to the topic(s) indicated in the data request. The relevance of the document entities to the topic(s) may be determined based on, for example, the number of occurrences of the topic(s) within the document entities, the degree of synonymity between the topic(s) and content of the document entities, whether the document entities were collected from an internal document or an external document, etc. Such determinations may include the use of one or more pattern matching techniques, such as regular expressions, fuzzy logic, pattern recognition models, etc.

Shredding engine 206 may be configured to separate document entities into entity subparts. The entity subparts may represent properties of the extracted document entities, such as entity identifier, name, description, date, profession, location, etc. Separating the document entities into entity subparts may include the use of one or more pattern matching techniques and/or machine learning techniques. These techniques may vary based on whether the document entities have been collected from internal documents or external documents.

As one example, a document entity collected from an internal document may comprise an entity identifier property, an author property, and a group property. The entity identifier property may be provided by, or specific to, the content surfacing platform and/or the enterprise and may identify the location of internal document within the content surfacing platform. The author property may identify the user id assigned by the enterprise or the content surfacing platform to the author of the document from which the document entity was collected. The group property may identify one or more groups of the enterprise in which the author of the document is a member. Accordingly, the document entities for the internal document may comprise properties that are implemented by or compatible with the content surfacing platform.

The pattern recognition model may classify the constituent properties of the document entity and separate the constituent properties (and values) into entity subparts. Each of the entity subparts may include source identifying information. The source identifying information may identify the document from which the corresponding document entity was extracted, the data store comprising the document, and/or the content provider that provided the document. For instance, a first entity subpart may comprise the entity identifier property, the author property, and corresponding values. A second entity subpart may comprise the entity identifier property, the group property, and corresponding values.

As another example, a document entity collected from an external document may comprise a source identifier property and a links property. In contrast to the properties of the internal document (i.e., entity identifier property, an author property, and a group property), the properties of the external document may not correspond to documents or storage locations within the content surfacing platform and/or the enterprise. Accordingly, document entities for the external document may comprise properties that are not implemented by or compatible with the content surfacing platform. For example, the source identifier property may identify a website URL that is external to the content surfacing platform. The links property may identify one or more hyperlinks on the website. Each of the hyperlinks may also be external to the content surfacing platform. The pattern recognition model may classify the constituent properties of the document entity as unknown.

In response to the classification, the content in the document entities for the external document may be assigned to generic properties or to properties known and implemented by the system. For example, the website URL may be assigned to a source ID property, which may indicate to the content surfacing platform that the URL is the source of the external document. Alternatively, the URL for the external document may be assigned to a site ID property of the content surfacing platform. The pattern recognition model may then separate the constituent properties (and values) of the external document into entity subparts, each of which may include source identifying information. For instance, an entity subpart for the external document may comprise a source identifier property, the links property, and corresponding values. The source identifier property and the links property may both be assigned to corresponding properties of (or compatible with) the content surfacing platform.

In some aspects, shredding engine 206 may be configured to shred other types of entities in addition to (or instead of) document entities. For example, document entity collection component 204 may collect website entities and/or content provider entities. The website entities may represent data that was extracted from a website. The website entities may relate to one or more topics described on the website. Shredding engine 206 may separate the website entities into website entity subparts and add the website identifier to each website entity subpart. The content provider entities may represent data that was extracted from a content provider. The content provider entities may relate to one or more topics described in content to which a content provider has access. Shredding engine 206 may separate the content provider entities into content provider entity subparts and add the content provider identifier to each content provider entity subpart.

Conflation engine 208 may be configured to merge entity subparts under one or more topics. To perform the merge process, conflation engine 208 may access the entity subparts generated and/or accessible by shredding engine 206. Conflation engine 208 may cluster the entity subparts under a respective topic using one or more artificial intelligence (AI), machine learning (ML), or other logic mechanisms, such as decision trees, logistic regression, support vector machines (SVM), k-nearest-neighbor (KNN) algorithms, neural networks, Naïve Bayes classifiers, linear regression, k-means clustering, or the like. For example, a probabilistic model may be used compare each entity subpart to a set of probability distributions corresponding to the entity subpart. The comparison may determine the probability that the entity subpart and a particular topic are associated with the same probability distribution. The determination may include comparing the determined probability to a predefined threshold. The threshold may define a value or a confidence level that an entity subpart should be merged to a topic. The value or a confidence level may indicate when an entity subpart and a topic (or another entity subpart) have a certain number properties in common. For example, such properties may include, but are not limited to, topic name (including acronyms, synonyms, diacritics), related people (e.g., document author, editor, contributor), content surfacing platform identifier (e.g., site ID, document ID), distribution lists (e.g., group ID, alias ID). When the determined probability exceeds the threshold, conflation engine 208 may merge the entity subpart to the topic to create or update a conflated topic. In some examples, conflation engine 208 may remove duplicate entity subparts from a population of entity subparts to prevent data duplication during the merging process.

As a specific example, conflation engine 208 may implement a Bayesian model comparison in which two models are used. The first model may be used generate a first probability that the two entity subparts are associated with the same underlying entity or topic. The second model may be used generate a second probability that the two entity subparts are independent and do not come from the same underlying entity or topic. A ratio between the first probability and the second probability may be computed and compared to a threshold value. If the ratio meets or exceeds the threshold, the two entity subparts may be merged into the underlying entity or topic. If the ratio does not exceed the threshold, the two entity subparts may not be merged into the underlying entity or topic.

In aspects, conflation engine 208 may be configured to merge entity subparts to topics at multiple granularity levels. As one example, entity subparts may be merged to topics at a document level. Merging at the document level may evaluate entity subparts in the context that topics are used or described in a particular document. For instance, two documents may include the topic "Seattle." The first document may refer to the city Seattle and the second document my refer to a project named Seattle. Conflation engine 208 may evaluate entity subparts for the first document in the context of the city Seattle and evaluate entity subparts for the second document in the context of the project Seattle. As another example, entity subparts may be merged to topics at a site level. Merging at the site level may evaluate entity subparts in the context that topics are used or described on a particular site. Although merging at the site level assumes that the documents and content on a site generally refer to the same topic, this need not be the case. For instance, entity subparts may be merged to one or more topics having the same (or a similar) name. As another example, entity subparts may be merged to topics at a content provider level. Merging at the content provider level may evaluate entity subparts in the context that topics are used or described by a particular content provider, or in the context of documents collected by a particular content provider.

Updating component 210 may be configured to update one or more knowledge bases with conflated topics. For example, updating component 210 may access the conflated topics generated by conflation engine 208. Updating component 210 may provide the conflated topics to one or more data stores, such as knowledge base 110. The data store(s) may then update their respective datasets using the conflated topics. Alternatively, updating component 210 may update the datasets of the data store(s) using the conflated topics. In some aspects, in addition to (or instead of) updating the data store(s), updating component 210 may provide one or more of the conflated topics to a user device. For example, in response to a data request relating to a topic, updating component 210 may provide or present response data for a corresponding conflated topic to the requesting user or user device. The response data may be provided in the context of a result on a search engine results page (SERP), a topic card, a topic page, or the like.

Having described various systems that may be employed by the aspects disclosed herein, this disclosure will now describe one or more methods that may be performed by various aspects of the disclosure. In aspects, method 300 may be executed by a system, such as system 100 of FIG. 1 or input processing system 200. However, method 300 is not limited to such examples. In other aspects, method 300 may be performed by a single device or component that integrates the functionality of the components of system 100 or input processing system 200. In at least one aspect, method 300 may be performed by one or more components of a distributed network, such as a web service/distributed network service (e.g. cloud service).

Figure 3:
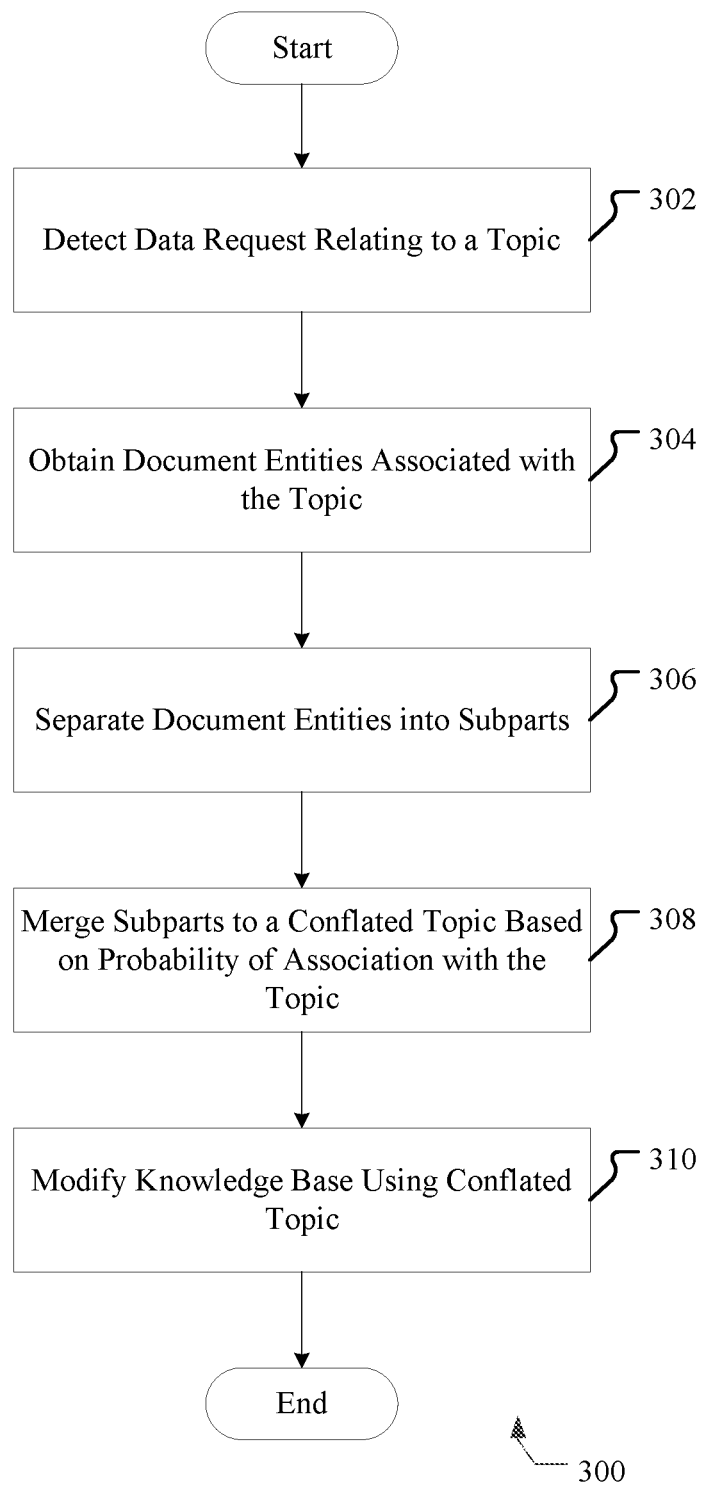
FIG. 3 illustrates an example method for method for securely cascading build pipelines to various platforms and/or devices.

FIG. 3 illustrates an example method for cross-provider topic conflation. Example method 300 begins at operation 302, where a data request may be detected. In aspects, a data request relating to one or more topics may be detected by an event detection component, such as detection component 202. The topics may relate to documents, files, and other types of content (collectively referred to as "documents") of or relating to, among other things, one or more enterprises. The data request may comprise one or more terms or indications of user intent. For instance, a data request may include a search query for the topic "Seattle." In some examples, the data request may be provided in real-time by a user of a user device, such as user device 108. In other examples, the data request may be received as part of an automated data retrieval process.

At operation 304, one or more document entities may be obtained. In response to the detected data request, a search mechanism, such as document entity collection component 204, may be used to search one or more data sources, such as entities store 106. The search may identify document entities, website entities, and/or content provider (collectively "document entities") associated with the topic(s) identified in the data request. The document entities may represent document content, such as metadata, data templates, topics, curated and non-curated topic pages, acronyms, synonyms, definitions, descriptions, experts, authors/contributors, etc. Each document entity may comprise an entity type (e.g., person, company, event) and a set of properties. For instance, a document entity for an entity type of "person" may comprise properties such as name, height, date of birth, profession, etc.

The document entities may be generated by and/or collected from multiple content providers, such as content providers 104, or from documents provided by multiple content providers. The documents from which the document entities were collected may comprise documents owned and/or accessible by a particular enterprise (internal documents) and documents that are not owned by the particular enterprise and/or are generally accessible to people that are not associated with the particular enterprise (external documents). For example, internal documents of an enterprise may be stored securely by a content surfacing platform used by the enterprise, whereas a set of external documents may be publicly available on the Internet.

The search mechanism may identify document entities relating or relevant to the topics using one or more pattern matching techniques, such as regular expressions, fuzzy logic, pattern recognition models, etc. The relation or relevance of a document entity may be based on, for example, the number of occurrences of the topic(s) within the document entities, the degree of synonymity between the topic(s) and content of the document entities, the context of the content in the document entities, the documents from which the document entities were collected, the content providers that collected the documents from which the document entities were collected, the users (e.g., authors, editors, contributors, group members) associated with the document entities, and the enterprise(s) owning or associated with the data sources, among others. The search mechanism may obtain one or more document entities determined to be relevant to the data request.

At operation 306, the document entities may be separated into entity subparts. In aspects, the document entities may be provided or accessible to a data separation component, such as shredding engine 206. The data separation component may separate the document entities into entity subparts such that each entity subpart corresponds to one or more individual properties of a document entity. Separating the document entities into entity subparts may include the use of one or more pattern matching techniques and/or machine learning techniques. For example, a pattern recognition model may be used to classify the constituent properties of a document entity. The pattern recognition model may separate the document entities by the properties and assign source identifying information to each separated property. The source identifying information may identify the document from which the corresponding document entity was extracted, the data store or site comprising the document, and/or the content provider that provided the document.

At operation 308, the entity subparts may be merged under a topic. In aspects, the entity subparts may be provided or accessible to a data merging component, such as conflation engine 208. The data merging component may cluster the entity subparts under a respective topic using one or more artificial intelligence (AI), machine learning (ML), or other logic mechanisms. For example, a probabilistic model may be used to project or map each entity subpart and/or topic into a probabilistic space where each entity subpart is associated with a probability distribution. A clustering algorithm may be used to compare the entity subparts to their respective probability distributions. The comparison may determine the probability that the entity subpart and a particular topic are associated with the same probability distribution. When the determined probability exceeds a threshold value, an entity subpart may be merged to the particular topic to create or update a conflated topic. The conflated topic(s) may comprise entity subparts from multiple content providers, thereby providing for cross-provider topic conflation. In examples, duplicate entity subparts (or entity subparts comprising substantially similar content) may be merged into a single entity subpart prior to topic conflation to prevent data duplication for a topic.

At operation 310, conflated topic(s) may be used to modify a knowledge base. In aspects, the conflated topic(s) may be provided or accessible to a presentation/updating mechanism, such as updating component 210. The presentation/updating mechanism may provide the conflated topic(s) to one or more data stores, such as knowledge base 110. The conflated topic(s) may be used to construct or update a knowledge base. For example, the conflated topic(s) may be used to construct an enterprise knowledge graph for an enterprise. Alternatively, the presentation/updating mechanism may provide the conflated topic(s) (or a representation thereof) to one or more users or user devices. For example, in response to a data request relating to a topic, response data relating to a corresponding conflated topic may be provided to a user in the format of an SERP, a topic card, a topic page, etc.

FIGS. 4-7 and the associated descriptions provide a discussion of a variety of operating environments in which aspects of the disclosure may be practiced. However, the devices and systems illustrated and discussed with respect to FIGS. 4-7 are for purposes of example and illustration and are not limiting of a vast number of computing device configurations that may be utilized for practicing aspects of the disclosure, described herein.

Figure 4:
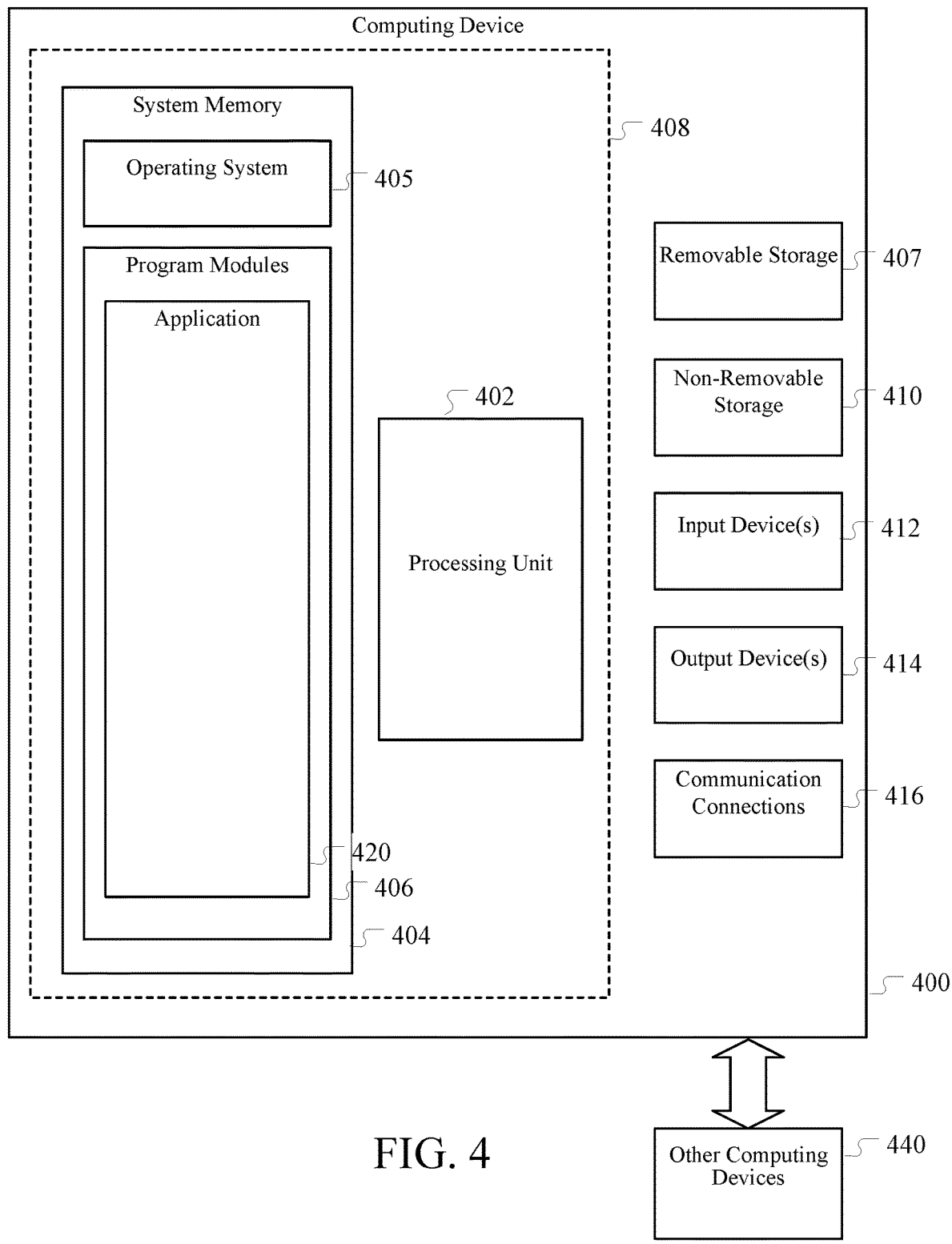
FIG. 4 is a block diagram illustrating example physical components of a computing device with which aspects of the disclosure may be practiced.

FIG. 4 is a block diagram illustrating physical components (e.g., hardware) of a computing device 400 with which aspects of the disclosure may be practiced. The computing device components described below may be suitable for the computing devices and systems described above. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories.

The system memory 404 may include an operating system 405 and one or more program modules 406 suitable for running software application 420, such as one or more components supported by the systems described herein. The operating system 405, for example, may be suitable for controlling the operation of the computing device 400.

Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., application 420) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 5A:
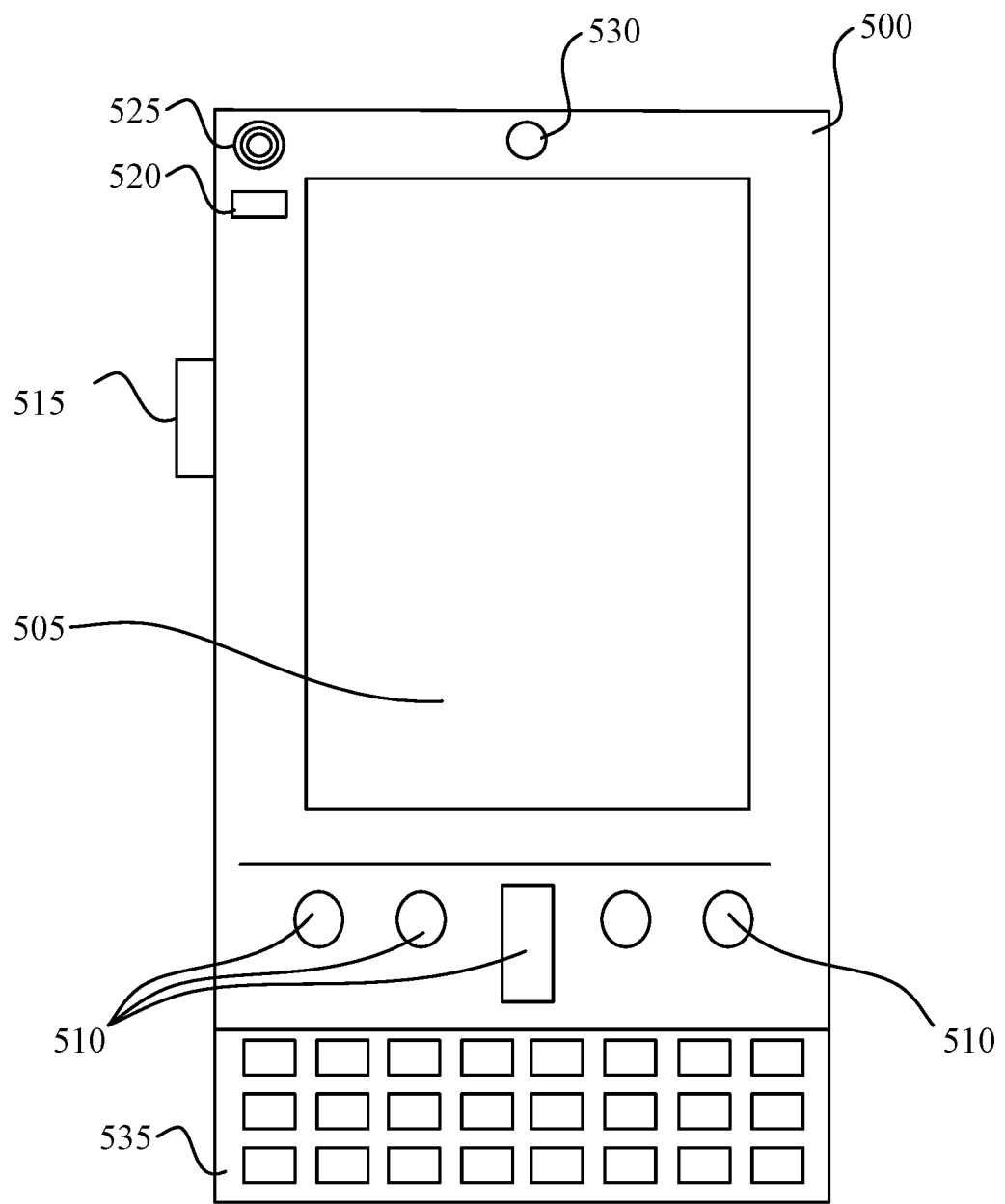
FIGS. 5A and 5B are simplified block diagrams of a mobile computing device with which aspects of the present disclosure may be practiced.
Figure 5B:
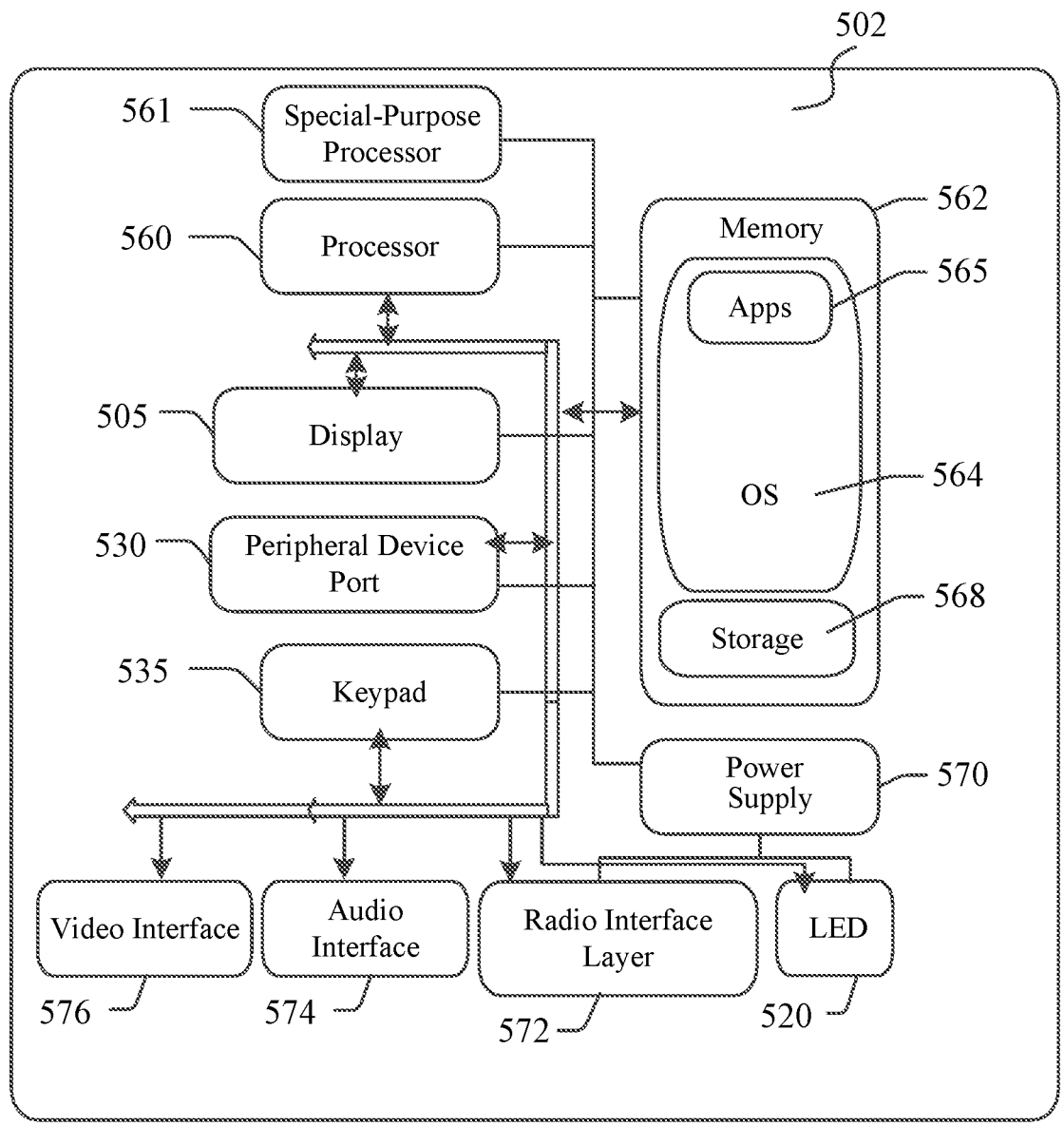

FIGS. 5A and 5B illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display).

If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments.

In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display.

In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500 described herein (e.g., search engine, extractor module, relevancy ranking module, answer scoring module).

The system 502 has a power supply 570, which may be implemented as one or more batteries. The power supply 570 might further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor(s) (e.g., processor 560 and/or special-purpose processor 561) and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of an on-board camera 530 to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

Figure 6:
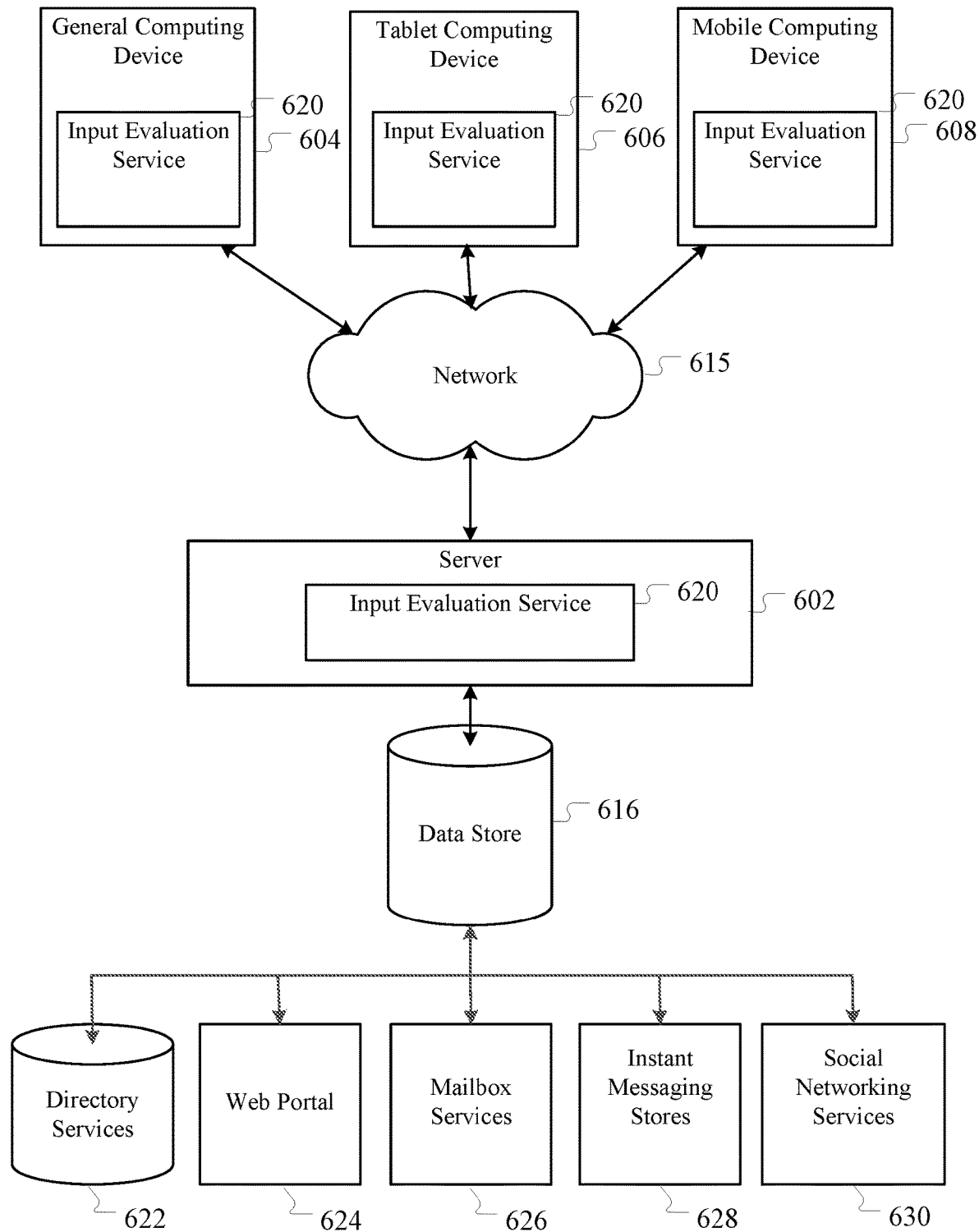
FIG. 6 is a simplified block diagram of a distributed computing system in which aspects of the present disclosure may be practiced.

FIG. 6 illustrates one aspect of the architecture of a system for processing data received at a computing system from a remote source, such as a personal computer 604, tablet computing device 606, or mobile computing device 608, as described above. Content displayed at server device 602 may be stored in different communication channels or other storage types. For example, various documents may be stored using a directory service 622, a web portal 624, a mailbox service 626, an instant messaging store 628, or a social networking site 630.

An input evaluation service 620 may be employed by a client that communicates with server device 602, and/or input evaluation service 620 may be employed by server device 602. The server device 602 may provide data to and from a client computing device such as a personal computer 604, a tablet computing device 606 and/or a mobile computing device 608 (e.g., a smart phone) through a network 615. By way of example, the computer system described above may be embodied in a personal computer 604, a tablet computing device 606 and/or a mobile computing device 608 (e.g., a smart phone). Any of these embodiments of the computing devices may obtain content from the store 616, in addition to receiving graphical data useable to be either pre-processed at a graphic-originating system, or post-processed at a receiving computing system.

Figure 7:
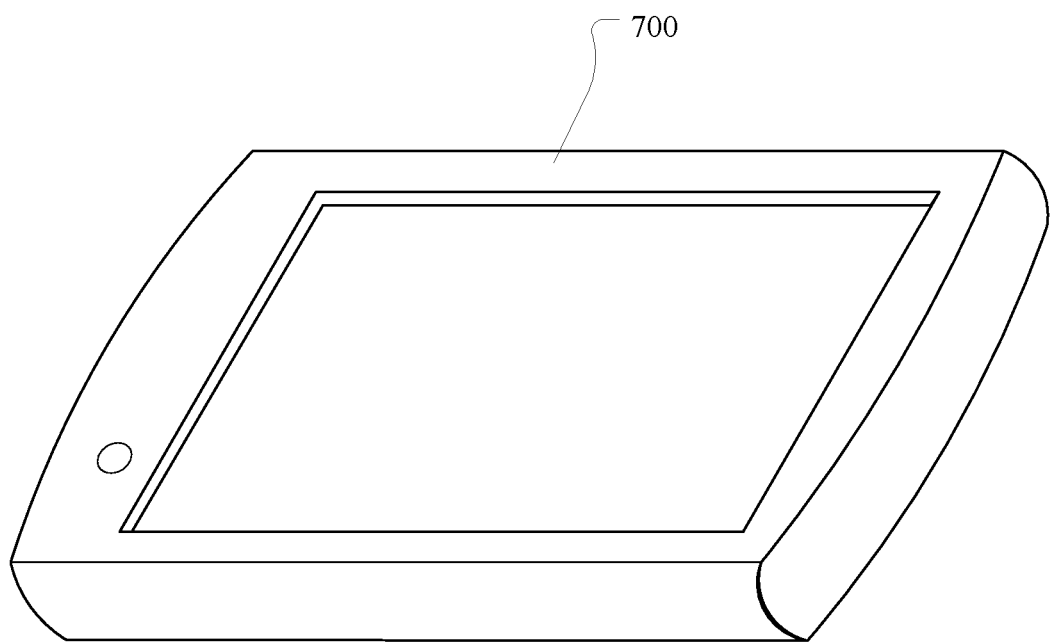
FIG. 7 illustrates a tablet computing device for executing one or more aspects of the present disclosure.

FIG. 7 illustrates an exemplary tablet computing device 700 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way.

The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer system to provide access to a corpus of data comprising:
    at least one processor; and
    memory coupled to the processor, the memory comprising computer executable instructions that, when executed by the processor, performs a method comprising:
        detecting a data request relating to a topic that is associated with an enterprise;
        obtaining document entities associated with the topic, wherein the document entities are collected from multiple content providers and represent document content;
        separating the document entities into subparts corresponding to properties of the document entities, wherein each of the subparts identifies a source of a respective document entity;
        merging two or more subparts of the subparts associated with the topic into a single subpart to create a conflated topic record, wherein the subparts of the two or more subparts are merged to the conflated topic record based on a probability that the subparts are associated with similar content, wherein determining the probability includes using a probabilistic model to map the two or more subparts into a probabilistic space and using a clustering algorithm to compare the probability to respective probability distributions;
        using the conflated topic record to modify a computer-implemented knowledge base associated with the enterprise, wherein modifying the computer-implemented knowledge base includes constructing, via the computer system, a knowledge graph based on the conflated topic record by removing at least one of duplicate, conflicting, and erroneous data; and
        providing, in response to a request to access the corpus of data relating to the topic, response data relating to the conflated topic record obtained from the knowledge base.

2. The system of claim 1, wherein one or more of the document entities are collected from an internal document of the enterprise, the internal document being at least one of owned by the enterprise or access restricted by the enterprise.

3. The system of claim 1, wherein one or more of the document entities are collected from an external document, the external document being at least one of:
    not owned by the enterprise; or
    not access restricted by the enterprise.

4. The system of claim 1, wherein obtaining the document entities comprises using a pattern matching technique to compare one or more terms in the data request to one or more terms in the document entities.

5. The system of claim 1, wherein obtaining the document entities comprises determining a relevance of the document entities to the topic.

6. The system of claim 5, wherein the relevance of the document entities to the topic is based on at least one of:
    a number of occurrences of the topic within the document entities; or
    a degree of synonymity between the topic and content of the document entities.

7. The system of claim 1, wherein the document entities represent at least one of:
    metadata;
    a topic page;
    an acronym;
    a definition; or
    a person having knowledge of the topic.

8. The system of claim 1, wherein the source of the respective document entity is at least one of:
    a document from which the respective document entity was extracted;
    a data store comprising the document from which the respective document entity was extracted; or
    a content provider that provided the document from which the respective document entity was extracted.

9. The system of claim 1, wherein the clustering algorithm removes duplicate subparts in the two or more of the subparts.

10. The system of claim 1, wherein comparing each of the one or more of the subparts to the respective probability distributions identifies a second probability that a subpart is associated with the topic.

11. The system of claim 10, wherein:
    the probability is compared to a threshold;
    when the probability meets or exceeds the threshold, the subpart is merged to the topic; and
    when the probability does not meet or exceed the threshold, the subpart is not merged to the topic.

12. The system of claim 1, wherein modifying the knowledge base comprises constructing or updating an enterprise knowledge graph for the enterprise.

13. The system of claim 12, wherein the enterprise knowledge graph comprises the conflated topic and is accessible by the enterprise.

14. The system of claim 1, wherein the data request is provided by a member of the enterprise.

15. A method for providing access to a corpus of data comprising:
    detecting a data request relating to a topic that is associated with an enterprise;
    obtaining, from a content surfacing platform associated with the enterprise, document entities associated with the topic, wherein the document entities are collected from multiple content providers and represent document content;
    separating the document entities into subparts corresponding to properties of the document entities, wherein each of the subparts identifies a source of a respective document entity;
    merging two or more subparts of the subparts associated with the topic into a single subpart to create a conflated topic record, wherein the subparts of the two or more subparts are merged to the conflated topic record based on a probability that the subparts are associated with similar content, wherein the probability is determined using a probabilistic model to map the two or more subparts into a probabilistic space and, using a clustering algorithm, comparing the two or more subparts to a respective probability distributions;

causing a computer-implemented knowledge base to be modified based on the conflated topic record by constructing a knowledge graph based on the conflated topic record that removes at least one of duplicate, conflicting, and erroneous data; and providing, by the content surfacing platform in response to the data request to access the corpus of data, response data comprising the conflated topic record to fulfill the data request.

16. The method of claim 15, wherein:

wherein one or more of the document entities are collected from an internal document owned by the enterprise; and wherein one or more of the document entities are collected from an external document not owned by the enterprise.

17. The method of claim 16, wherein:

the content surfacing platform implements a set of properties that are compatible with the content surfacing platform; and separating the document entities collected from the external document comprises reassigning one or more properties of the document entities from the external document to one or more properties in the set of properties that are compatible with the content surfacing platform.

18. The method of claim 15, wherein the response data is in the format of at least one of:

an search engine results page (SERP);

a topic card; or a topic page.

19. A content surfacing platform for p[providing access to a corpus of data comprising:

at least one processor; and memory coupled to the processor, the memory comprising computer executable instructions that, when executed by the at least one processor, performs a method comprising:

obtaining document entities associated with a topic, wherein the document entities represent document content and are collected from multiple content providers associated with an enterprise, the enterprise representing at least one of an organization, a business, or a group;

separating the document entities into subparts corresponding to properties of the document entities, wherein each of the subparts identifies a source of a respective document entity;

merging, using machine learning, two or more subparts of the subparts associated with the topic into a single subpart to create a conflated topic record, wherein the conflated topic record comprise subparts from at least two of the multiple content providers and are merged to create the conflated topic record based on a probability that the two or more subparts are associated with similar content, the probability is determined using a probabilistic model that maps the two or more sub arts into a probabilistic space and a clustering algorithm that compares the two or more the subparts to respective probability distributions;

providing the conflated topic record to a knowledge base associated with the enterprise; and causing the knowledge base associated with the enterprise to be modified based on the conflated topic record by removing at least one of duplicate, conflicting, and erroneous data.

20. The system of claim 1, wherein merging the two or more subparts of the subparts associated with the topic into the single subpart to create the conflated topic is further based on an identifier of the source of the respective document entity.

* * * * *